United States Patent Office 2,809,203
Patented Oct. 8, 1957

2,809,203

METHOD OF CONVERTING LEVULINIC ACID INTO ALPHA ANGELICA LACTONE

Reid H. Leonard, Pensacola, Fla., assignor, by mesne assignments, to Heyden Newport Chemical Corporation, New York, N. Y., a corporation of Delaware No Drawing. Application May 14, 1953,
Serial No. 355,171

2 Claims. (Cl. 260—343.6)

This invention relates to a method of converting levulinic acid into alpha angelica lactone, and more particularly to a method for carrying out such conversion in the absence of a catalyst.

It has heretofore been proposed to convert levulinic acid into alpha angelica lactone by the use of an acid catalyst such as phosphoric acid. However, the yields have not been particularly good, especially if the temperature was held low enough to produce mainly alpha rather than a mixture of alpha and beta angelica lactone.

In accordance with my present invention, I am able to produce alpha angelica lactone substantially free from beta- and in good yeld, without the use of any catalyst. I have found that if levulinic acid is subjected to distillation under vacuum and under controlled temperature conditions, alpha angelica lacetone of good quality can be produced without the use of a catalyst.

It is therefore an important object of my invention to produce alpha angelica lactone of good quality and with a high rate of conversion by a relatively simple process that requires the use of no catalyst.

Other and further important objects of my invention will become apparent from the following description and appended claims.

It is known that the dehydration of levulinic acid produces not the acid anhydride but an unsaturated lactone. An intermediate closed ring form of levulinic acid is probably produced, as indicated by the following equation:

$$\underset{\text{Levulinic acid}}{\begin{array}{c}CH_2-CH_2\\|\quad\quad|\\CH_3-C\quad C=O\\\|\quad\quad|\\O\quad\quad OH\end{array}} \rightleftharpoons \begin{array}{c}CH_2-CH_2\\|\quad\quad|\\CH_3-C\quad\quad C=O\\\diagdown\quad\diagup\\OH\quad O\end{array} \rightarrow \underset{\substack{\text{Alpha angelica}\\\text{lactone}}}{\begin{array}{c}CH-CH_2\\\|\quad\quad|\\CH_3-C\quad\quad C=O\\\diagdown\quad\diagup\\O\end{array}}$$

In my present method, levulinic acid is subjected to vacuum distillation at pot temperatures of between 140° and 200° C., and preferably at between 150° and 175° C., with corresponding vapor pressures within the pot, viz. between about 10 and 150 mm. Hg pressure, and between about 17 and 50 mm., respectively. No catalyst has been found necessary in the carrying out of this method.

The following example will serve to illustrate a preferred embodiment of my invention.

In this case, a 4″ diameter, packed column was used for the production of alpha angelica lactone from levulinic acid. An inert, non-catalytic packing such as porcelain beryl saddles was used. The following data are given:

| | | |
|---|---|---|
| Pot volume [1] | ml | 2350 |
| Pot temperature | °C | 170±2 |
| Rate of levulinic acid feed | ml./hr | 830 |
| Vapor temperature | °C | 109 |
| Vapor pressure | mm | 23.5 |
| Reflux rate | ml./hr | 2940 |
| Distillate condensed | ml./hr | 790 |

[1] Pot volume is the volume of levulinic acid in the pot.

The rate of distillation is such that a volume of levulinic acid equivalent to the pot volume is converted in about 4 hours.

Composition of distillate:

| | Gm. per liter |
|---|---|
| Levulinic acid | 206 |
| Alpha angelica lactone | 772 |
| Water | 105 |

The distillate so obtained was separated by vacuum fractional distillation at 20 mm. Hg pressure into cuts, including one of alpha angelica lactone of good quality. The water was removed as condensate and the levulinic acid returned to the still for conversion. The conversion to alpha angelica lactone was 90% of the theoretical. Under the conditions given in this example less than 5% of the beta angelica lactone was formed, based upon the weight of levulinic acid started with.

An important factor in the preferential formation of the alpha- rather than beta angelica lactone is the removal, as soon as formed, of alpha angelica lactone or water, or both. Thus, in my method, the process can be made a continuous one, with good yields of alpha angelica lactone, if a vacuum still is used, either packed or bubble-cap, and the distillate is condensed continuously as formed. The condensate is then run through a separator, from which the water is taken off from the top and alpha angelica lactone from the bottom. A certain proportion of the latter is returned to the still as reflux. The overhead distillate temperature should preferably be kept below 120° C.

I claim as my invention:

1. The method of converting levulinic acid into alpha angelica lactone, which comprises subjecting levulinic acid in the absence of a catalyst to continuous distillation at a pot temperature between 150° and 175° C. under a pressure of between 17 and 50 mm. of mercury absolute, continuously taking off a distillate comprising alpha angelica lactone and water as fast as said distillate is formed, separating water from said distillate, and collecting alpha angelica lactone.

2. The method of converting levulinic acid into alpha angelica lactone, which comprises subjecting levulinic acid in the absence of a catalyst to continuous distillation at a pot temperature between 150° and 175° C., under a pressure of between 17 and 50 mm. of mercury absolute, continously taking off a distillate comprising alpha angelica lactone and water as fast as said distillate is formed and at an overhead distillate temperature below 120° C., separating water from said distillate and collecting alpha angelica lactone.

References Cited in the file of this patent

FOREIGN PATENTS 745,313     Germany     Mar. 2, 1944

OTHER REFERENCES

Wolff: Annalen, vol. 229, pages 249–254 (1885).
Thiele et al.: Annalen, 319, pages 180–193 (1901).